(12) United States Patent
Hsu et al.

(10) Patent No.: US 9,150,754 B2
(45) Date of Patent: Oct. 6, 2015

(54) LIQUID CRYSTAL ALIGNMENT AGENT, AND LIQUID CRYSTAL ALIGNMENT FILM AND LIQUID CRYSTAL DISPLAY ELEMENT FORMED FROM THE LIQUID CRYSTAL ALIGNMENT AGENT

(71) Applicant: CHI MEI CORPORATION, Tainan (TW)

(72) Inventors: Li-Tao Hsu, Kaohsiung (TW); Yu-Hao Liang, Kaohsiung (TW); Huai-Pin Hsueh, Tainan (TW)

(73) Assignee: Chi Mei Corporation, Tainan (TW)

( * ) Notice: Subject to any disclaimer, the term of this patent is extended or adjusted under 35 U.S.C. 154(b) by 62 days.

(21) Appl. No.: 13/920,599

(22) Filed: Jun. 18, 2013

(65) Prior Publication Data

US 2014/0024752 A1 Jan. 23, 2014

(30) Foreign Application Priority Data

Jul. 17, 2012 (TW) .............................. 101125607 A

(51) Int. Cl.
*C09K 19/00* (2006.01)
*C09D 179/08* (2006.01)
(Continued)

(52) U.S. Cl.
CPC ................ *C09D 179/08* (2013.01); *C08K 5/06* (2013.01); *C08K 5/17* (2013.01); *C08K 5/20* (2013.01); *C08K 5/3415* (2013.01); *G02F 1/133711* (2013.01); *G02F 1/133723* (2013.01);
(Continued)

(58) Field of Classification Search
CPC .. C08K 5/20; C08K 5/3415; G02F 1/133723; G02F 1/133711; C08G 73/10; C08G 73/1007; C08G 73/101; Y10T 428/10; Y10T 428/1005; Y10T 428/1018; Y10T 428/1023
USPC ............... 428/1.1, 1.2, 1.25, 1.26, 1.27, 1.28; 525/419, 425, 428; 524/104, 109
See application file for complete search history.

(56) References Cited

U.S. PATENT DOCUMENTS

2006/0134348 A1* 6/2006 Momoi .......................... 428/1.1

FOREIGN PATENT DOCUMENTS

JP 2008033257 A * 2/2008
TW 200804517 1/2008
(Continued)

OTHER PUBLICATIONS

TW 200844141 Search Report issued Feb. 26, 2014.
(Continued)

*Primary Examiner* — Ruiyun Zhang
(74) *Attorney, Agent, or Firm* — Jianq Chyun IP Office

(57) ABSTRACT

A liquid crystal alignment agent includes a polymer composition obtained by subjecting a diamine component and a tetracarboxylic dianhydride component to a reaction, a solvent, and a hydroxyl compound. Preferably, the hydroxyl compound has a weight average molecular weight ranging from 300 to 1,000,000. A liquid crystal alignment film formed from the liquid crystal alignment agent and a liquid crystal display element including the liquid crystal alignment film are also disclosed.

8 Claims, 1 Drawing Sheet

(51) Int. Cl.
*C08K 5/3415* (2006.01)
*C08K 5/17* (2006.01)
*C08K 5/06* (2006.01)
*C08K 5/20* (2006.01)
*G02F 1/1337* (2006.01)
*C08G 73/10* (2006.01)

(52) U.S. Cl.
CPC .......... *C08G 73/105* (2013.01); *C08G 73/1042* (2013.01); *C08G 73/1046* (2013.01); *C08G 73/1067* (2013.01); *C08G 73/1071* (2013.01); *C08G 73/1075* (2013.01); *C08G 73/1078* (2013.01); *Y10T 428/10* (2015.01); *Y10T 428/1005* (2015.01); *Y10T 428/1018* (2015.01); *Y10T 428/1023* (2015.01)

(56) References Cited

FOREIGN PATENT DOCUMENTS

TW           200844141       11/2008
WO     WO 2008/078796 A1     7/2008

OTHER PUBLICATIONS

TW Application 101125607—Search report issued Mar. 27, 2014, with English abstract.

* cited by examiner

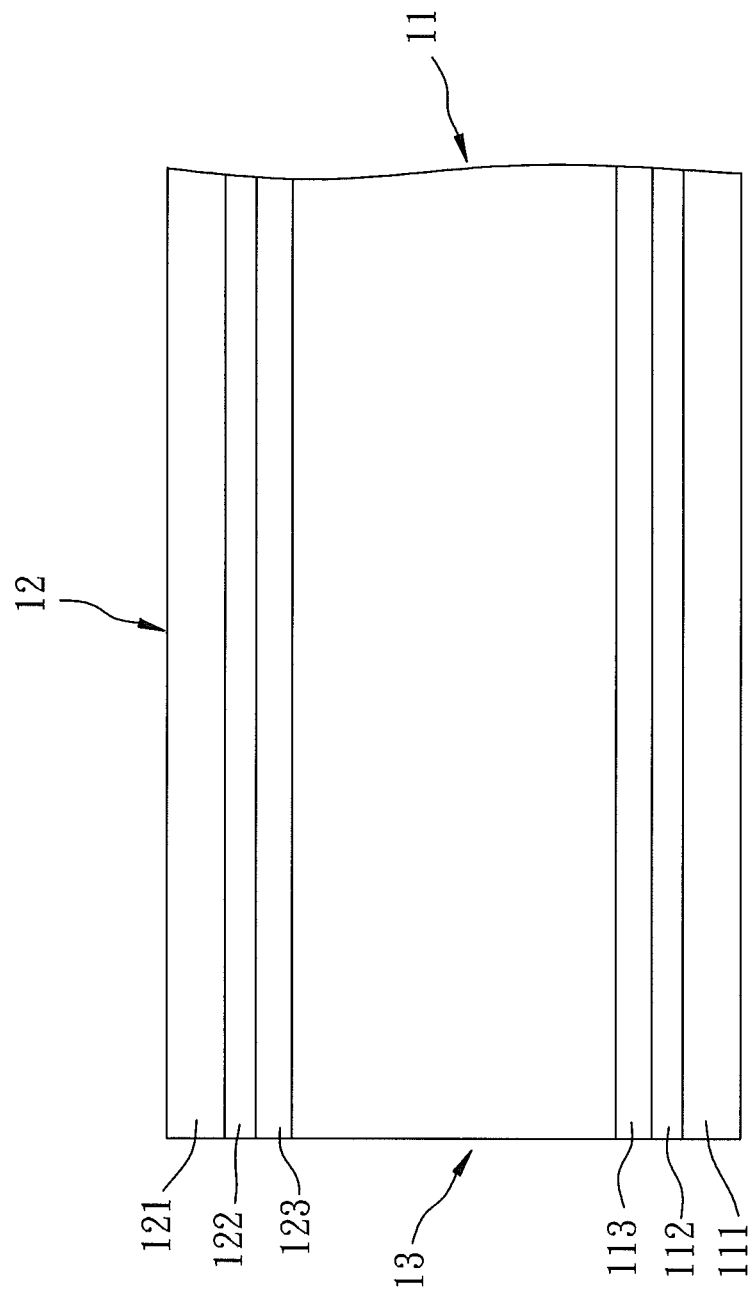

LIQUID CRYSTAL ALIGNMENT AGENT, AND LIQUID CRYSTAL ALIGNMENT FILM AND LIQUID CRYSTAL DISPLAY ELEMENT FORMED FROM THE LIQUID CRYSTAL ALIGNMENT AGENT

CROSS-REFERENCE TO RELATED APPLICATION

This application claims priority of Taiwanese Application No. 101125607, filed on Jul. 17, 2012.

BACKGROUND OF THE INVENTION

1. Field of the Invention

This invention relates to a liquid crystal alignment agent, more particularly to a liquid crystal alignment agent including a hydroxyl compound with a specific weight average molecular weight range. The invention also relates to a liquid crystal alignment film formed from the liquid crystal alignment agent, and a liquid crystal display element including the liquid crystal alignment film.

2. Description of the Related Art

Due to an increasing demand for liquid crystal display devices with a wide viewing angle characteristic, liquid crystal display devices are being developed toward high performance, and thus the requirement for good electrical and/or displaying qualities in terms of liquid crystal alignment property, voltage holding ratio, ion density, image sticking, or the like has become stricter. It is also desirable to maintain such good qualities during long-term use. Among the aforesaid qualities, voltage holding ratio and ion density are of primary concern. When the voltage holding ratio of a liquid crystal display device is undesirably reduced, the displaying quality cannot satisfy the requirement for high contrast and high light transmission. On the other hand, when the ion density is undesirably increased, the image sticking problem may occur.

WO 2008/078796 discloses a liquid crystal alignment film having a high voltage holding ratio and a low ion density, and an N-substituted diamine compound used for preparing the liquid crystal alignment film. The N-substituted diamine compound is represented as follow:

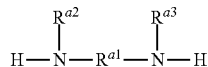

where $R^{a1}$ represents a $C_1$-$C_5$ alkylene group, $R^{a2}$ and $R^{a1}$ independently represent hydrogen or a $C_1$-$C_4$ alkyl group, and at least one of $R^{a2}$ and $R^{a3}$ is a $C_1$-$C_4$ alkyl group. The problems of inferior voltage holding ratio and undesirably high ion density encountered in conventional liquid crystal display devices can be improved by using the N-substituted diamine compound for preparing the liquid crystal alignment film. However, the liquid crystal alignment film made by using the N-substituted diamine compound still has the problems of reduced voltage holding ratio and increased ion density after a period of exposure to ultraviolet (UV) irradiation. Problems such as reduced contrast and image sticking may also arise when the liquid crystal alignment film disclosed in WO 2008/078796 is used in a liquid crystal display device.

There is an increasing demand in the art for a liquid crystal alignment agent having superior UV stability so that a high voltage holding ratio and a low ion density of a liquid crystal display device employing a liquid crystal alignment film formed from the liquid crystal alignment agent can be maintained even after long-term UV irradiation.

SUMMARY OF THE INVENTION

Therefore, an object of the present invention is to provide a liquid crystal alignment agent.

Another object of the present invention is to provide an alignment film formed from the liquid crystal alignment agent.

A further object of the present invention is to provide a liquid crystal display element which includes the liquid crystal alignment film, and which has a high voltage holding ratio and a low ion density that can be maintained after long-term UV irradiation.

According to a first aspect of this invention, there is provided a liquid crystal alignment agent which includes a polymer composition obtained by subjecting a diamine component and a tetracarboxylic dianhydride component to a reaction, a solvent, and a hydroxyl compound. Preferably, the hydroxyl compound has a weight average molecular weight ranging from 300 to 1,000,000.

According to a second aspect of this invention, there is provided a liquid crystal alignment film formed from the liquid crystal alignment agent of this invention.

According to a third aspect of this invention, there is provided a liquid crystal display element including the liquid crystal alignment film of this invention.

BRIEF DESCRIPTION OF THE DRAWING

Other features and advantages of the present invention will become apparent in the following detailed description of the preferred embodiments with reference to the accompanying drawing, of which:

FIG. 1 is a fragmentary schematic view of a preferred embodiment of a liquid crystal display element according to this invention.

DETAILED DESCRIPTION OF THE PREFERRED EMBODIMENTS

Liquid Crystal Alignment Agent:

The liquid crystal alignment agent of the present invention includes: (A) a polymer composition obtained by subjecting (a) a diamine component and (b) a tetracarboxylic dianhydride component to a reaction, (B) a solvent, and (C) a hydroxyl compound. Preferably, the hydroxyl compound (C) has a weight average molecular weight ranging from 300 to 1,000,000.

When a liquid crystal alignment agent which does not contain a hydroxyl compound having a weight average molecular weight ranging from 300 to 1,000,000 is used, a liquid crystal alignment film formed therefrom will have the disadvantages of reduced voltage holding ratio and increased ion density after a long term of use under an UV irradiation environment.

More preferably, the weight average molecular weight of the hydroxyl compound (C) ranges from 500 to 900,000. Most preferably, the weight average molecular weight of the hydroxyl compound (C) ranges from 700 to 800,000.

The hydroxyl compound (C) is used in an amount ranging preferably from 1 to 15 parts by weight, more preferably from 2 to 12 parts by weight, and most preferably from 3 to 10 parts by weight based on 100 parts by weight of the polymer composition.

Polymer Composition (A):

The polymer composition (A) is obtained by subjecting (a) a diamine component and (b) a tetracarboxylic dianhydride component to a reaction.

The polymer composition (A) is selected from polyamic acid, polyimide, polyimide series block copolymer, or combinations thereof. The polyimide series block copolymer is selected from polyamic acid block copolymer, polyimide block copolymer, polyamic acid-polyimide block copolymer, and combinations thereof.

The polyamic acid, the polyimide, and the polyimide series block copolymer can be obtained by subjecting the diamine component (a) and the tetracarboxylic dianhydride component (b) to a reaction.

Diamine Component (a):

The diamine component (a) is generally selected from (1) aliphatic diamine compounds, (2) alicyclic diamine compounds, and (3) aromatic diamine compounds.

Examples of the aliphatic diamine compounds include, but are not limited to, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane, 1,2-bis(3-aminopropoxy)ethane, or the like.

Examples of the alicyclic diamine compounds include, but are not limited to, 4,4'-diaminodicyclohexylmethane, 4,4'-diamino-3,3'-dimethyldicyclohexylamine, 1,3-diaminocyclohexane, 1,4-diaminocyclohexane, isophoronediamine, tetrahydrodicyclopentadienylene diamine, tricyclic[6.2.1.0$^{2,7}$]-undecylenedimethylene diamine, 4,4'-methylenebis(cyclohexylamine), or the like.

Examples of the aromatic diamine compounds include, but are not limited to, 4,4'-diaminodiphenylmethane, 4,4'-diaminodiphenylethane, 4,4'-diaminodiphenylsulfone, 4,4'-diaminobenzanilide, 4,4'-diaminodiphenylether, 3,4'-diaminodiphenylether, 1,5-diaminonaphthalene, 5-amino-1-(4'-aminophenyl)-1,3,3-trimethylindane, 6-amino-1-(4'-aminophenyl)-1,3,3-trimethylindane, hexahydro-4,7-methanoindanylenedimethylene diamine, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,10-bis(4-aminophenyl)anthracene, 2,7-diaminofluorene, 9,9-bis(4-aminophenyl)fluorene, 4,4'-methylene-bis(2-chloroaniline), 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-bis[(4-amino-2-trifluoromethyl)phenoxy]octafluorobiphenyl, 5-[4-(4-n-pentylcyclohexyl)cyclohexyl]phenylmethylene-1,3-diaminobenzene, 1,1-bis[4-4-aminophenoxy)phenyl]-4-(4-ethylphenyl)cyclohexane, or the like.

In addition to the aforesaid examples of the diamine compounds, the diamine component (a) useful for the present invention includes compounds represented by the following formulas (I-1)-(I-16):

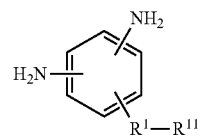
(I-1)

where $R^1$ represents —O—, —COO—, —OCO—, —NHCO—, —CONH—, or —CO—; $R^{11}$ represents a monovalent group having a group selected from the group consisting of a steroid skeleton, a trifluoromethyl group, a fluoro group, a $C_2$-$C_{30}$ alkyl group, and a nitrogen-containing cyclic structure derived from pyridine, pyrimidine, triazine, piperidine and piperazine,

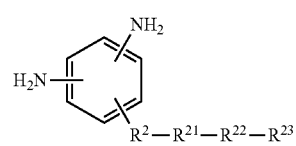
(I-2)

where $R^2$ represents —O—, —COO—, —COO—, —NHCO—, —CONH—, or —CO—; $R^{21}$ and $R^{22}$ respectively represent a divalent group selected from the group consisting of an alicyclic group, an aromatic group, and a heterocyclic group; $R^{23}$ represents a $C_3$-$C_{18}$ alkyl group, a $C_3$-$C_{18}$ alkoxy group, a $C_1$-$C_5$ fluoroalkyl group, a $C_1$-$C_5$ fluoroalkoxy group, a cyano group, or a halogen atom,

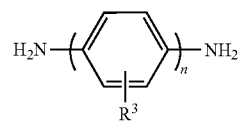
(I-3)

where $R^3$ represents hydrogen, a $C_1$-$C_5$ acyl group, a $C_1$-$C_5$ alkyl group, a $C_1$-$C_5$ alkoxy group, or halogen; $R^3$ in each repeating unit may be the same or different; and n is an integer ranging from 1 to 3,

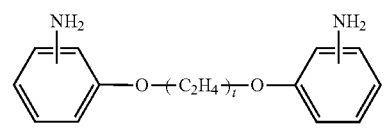
(I-4)

where t is an integer ranging from 2 to 12,

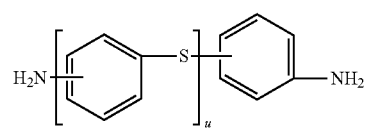
(I-5)

where u is an integer ranging from 1 to 5,

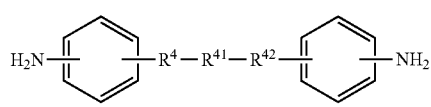 (I-6)

where R⁴ and R⁴² may be the same or different, and independently represent a divalent organic group; and R⁴¹ represents a divalent group that has a ring structure containing a nitrogen atom and that is derived from the group consisting of pyridine, pyrimidine, triazine, piperidine and piperazine,

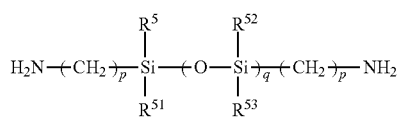 (I-7)

where $R^5$, $R^{51}$, $R^{52}$, and $R^{53}$ may be the same or different, and independently represent a $C_1$-$C_{12}$ hydrocarbon group; p is an integer ranging from 1 to 3; and q is an integer ranging from 1 to 20,

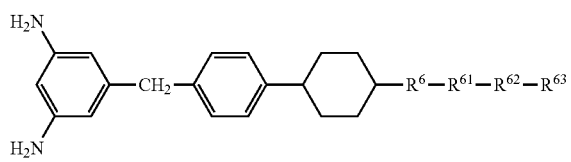 (I-8)

where $R^6$ represents —O— or cyclohexylene; $R^{61}$ represents —CH₂—; $R^{62}$ represents phenylene or cyclohexylene; and $R^{63}$ represents hydrogen or heptyl,

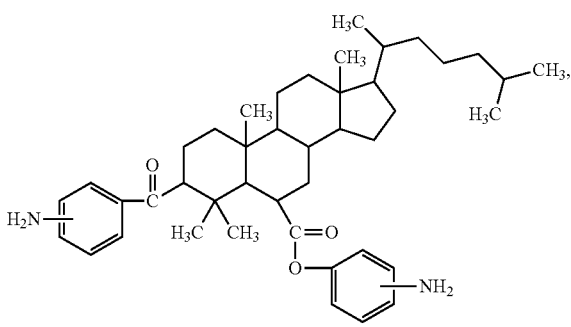 (I-9)

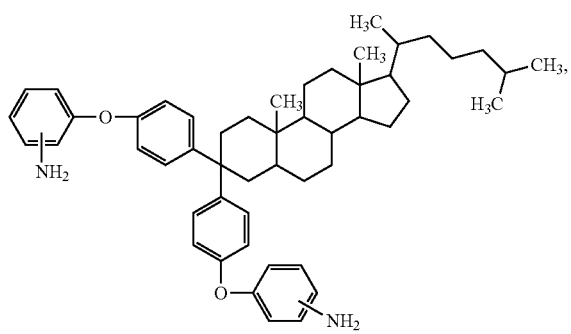 (I-10)

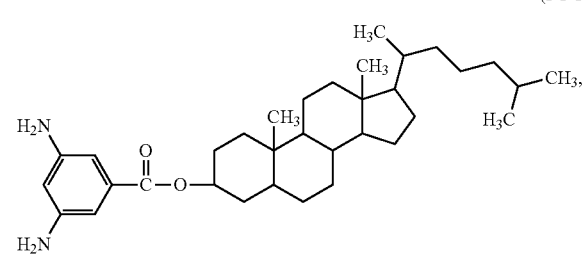

Preferred examples of the diamine compound represented by formula (I-1) include 2,4-diaminophenyl ethyl formate, 3,5-diaminophenyl ethyl formate, 2,4-diaminophenyl propyl formate, 3,5-diaminophenyl propyl formate, 1-dodecoxy-2,4-aminobenzene, 1-hexadecoxy-2,4-aminobenzene, 1-octadecoxy-2,4-aminobenzene,

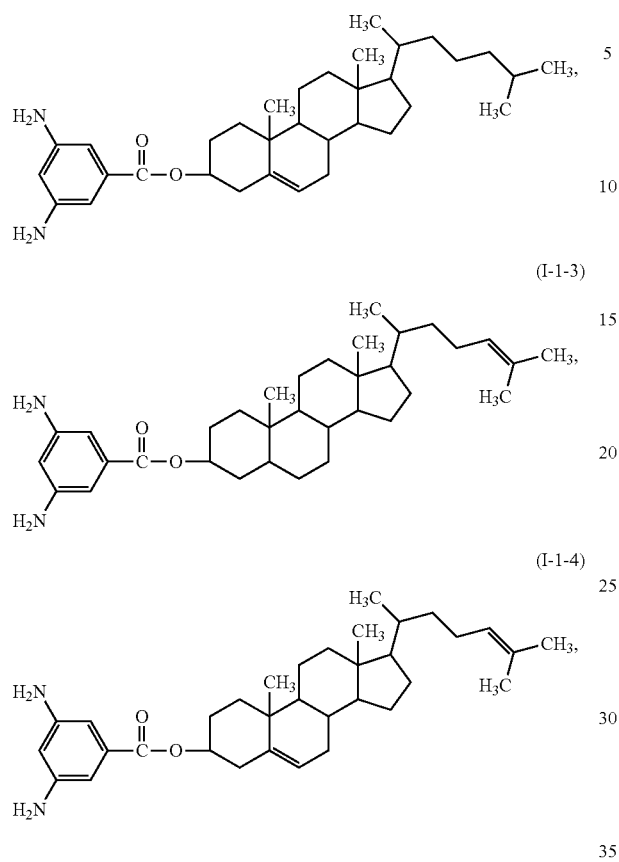
or the like.
Preferred examples of the diamine compound represented by formula (I-2) include
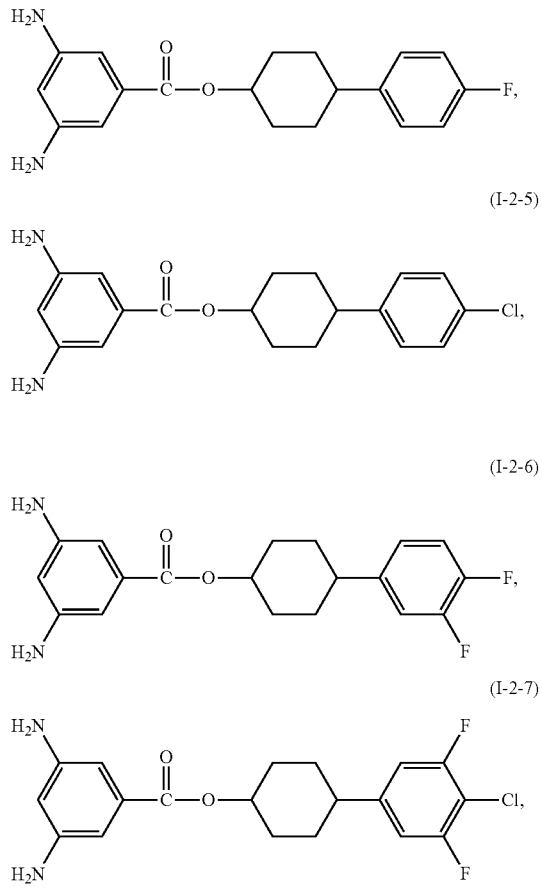
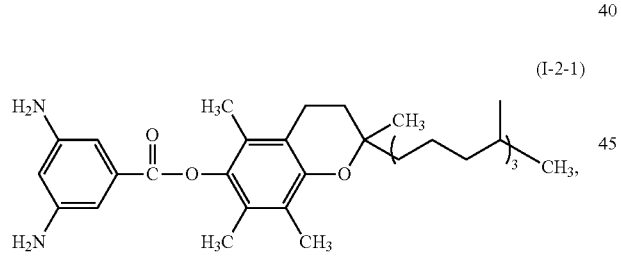
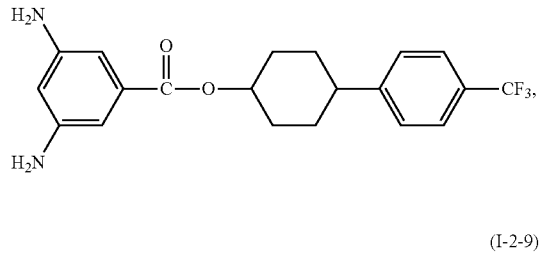
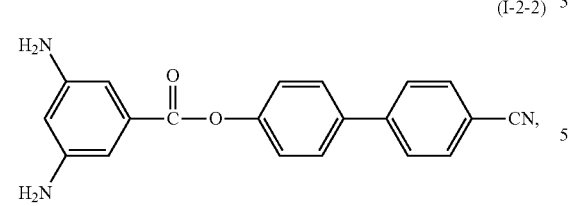
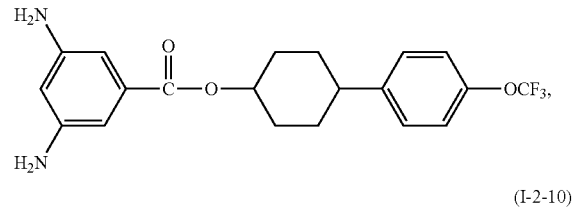
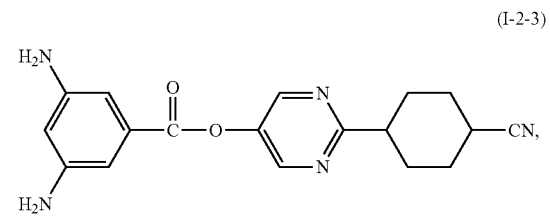
(where v represents an integer ranging from 3 to 12),

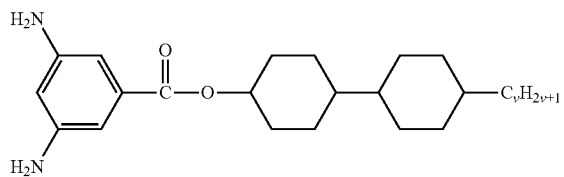

(I-2-11)

(where v represents an integer ranging from 3 to 12),

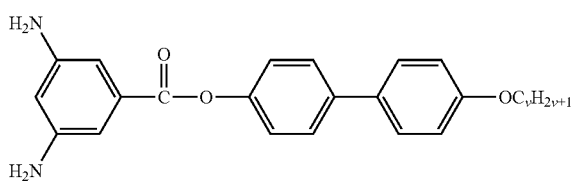

(I-2-12)

(where v represents an integer ranging from 3 to 12),

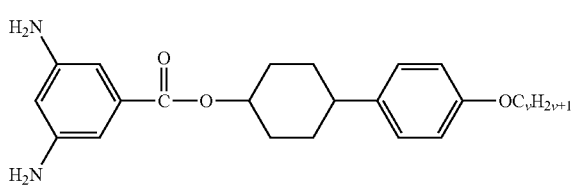

(I-2-13)

(where v represents an integer ranging from 3 to 12), or the like.

Preferred examples of the diamine compound represented by formula (I-3) include: (1) p-diaminobenzene, m-diaminobenzene, o-diaminobenzene, 2,5-diaminotoluene, or the like when n is 1; (2) 4,4'-diaminobiphenyl, 2,2'-dimethyl-4,4'-diaminobiphenyl, 3,3'-dimethyl-4,4'-diaminobiphenyl, 3,3'-dimethoxy-4,4'-diaminobiphenyl, 2,2'-dichloro-4,4'-diaminobiphenyl, 3,3'-dichloro-4,4'-diaminobiphenyl, 2,2',5,5'-tetrachloro-4,4'-diaminobiphenyl, 2,2'-dichloro-4,4'-diamino-5,5'-dimethoxybiphenyl, 4,4'-diamino-2,2'-bis(trichloromethyl)biphenyl, or the like when n is 2; and (3) 1,4-bis(4'-aminophenyl)benzene, or the like when n is 3. More preferably, the diamine compound represented by formula (I-3) is selected from p-diaminobenzene, 2,5-diaminotoluene, 4,4'-diaminobiphenyl, 3,3'-dimethoxy-4,4'-diaminobiphenyl, and 1,4-bis(4'-aminophenyl)benzene.

Preferably, the diamine compound represented by formula (I-5) is 4,4'-diaminodiphenylsulfide.

Preferably, the diamine compound represented by formula (I-8) is selected from

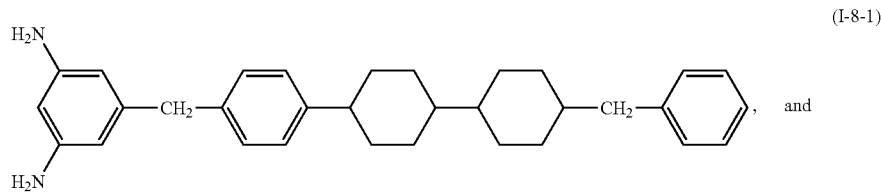

(I-8-1)

and

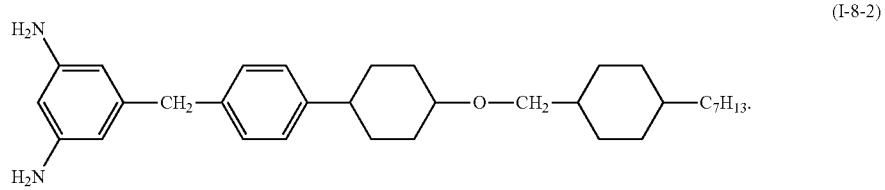

(I-8-2)

Preferred examples of the diamine component (a) suitable for the present invention include, but are not limited to, 1,2-diaminoethane, 4,4'-diaminodicyclohexylmethane, 4,4'-diaminodiphenylmethane, 4,4'-diaminodiphenylether, 5-[4-(4-n-pentylcyclohexyl)cyclohexyl]phenylmethylene-1,3-diaminobenzene, 1,1-bis[4-4-aminophenoxy)phenyl]-4-(4-ethylphenyl)-cyclohexane, 2,4-diaminophenylformic acid ethyl ester, the diamine compounds represented by formulae (I-1-1), (I-1-2), (I-2-1), and (I-2-11), p-diaminobenzene, m-diaminobenzene, o-diaminobenzene, the diamine compound represented by formula (I-8-1), or the like.

The aforesaid diamine compounds may be used alone or in admixture of two or more thereof.

Tetracarboxylic Dianhydride Component (b):

The tetracarboxylic dianhydride component (b) includes at least one tetracarboxylic dianhydride compound selected from (1) an aliphatic tetracarboxylic dianhydride compound, (2) an alicyclic tetracarboxylic dianhydride compound, and (3) an aromatic tetracarboxylic dianhydride compound. These teracarboxylic dianhydride compounds may be used alone or in admixture of two or more thereof.

Examples of the aliphatic tetracarboxylicdianhydride compound include, but are not limited to, ethanetetracarboxylic dianhydride, butanetetracarboxylic dianhydride, or the like.

Examples of the alicyclic tetracarboxylic dianhydride compound include, but are not limited to, 1,2,3,4-cyclobutanetetracarboxylic dianhydride, 1,2-dimethyl-1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-tetramethyl-1,2,3,4-cyclobutanetetracarboxylic dianhydride, 1,2,3,4-cyclopentanetetracarboxylic dianhydride, 1,2,4,5-cyclohexanetetracarboxylic dianhydride, 3,3',4,4'-dicyclohexanetetracarboxylic dianhydride, cis-3,7-dibutylcycloheptyl-1,5-diene-1,2,5,6-tetracarboxylic dianhydride, 2,3,5- tricarboxylcyclopentylacetic dianhydride, bicyclo[2.2.2]-octa-7-ene-2,3,5,6-tetracarboxylic dianhydride, or the like.

Examples of the aromatic tetracarboxylic dianhydride include, but are not limited to, 3,4-dicarboxy-1,2,3,4-tetrahydronaphthalene-1-succinic acid dianhydride, pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3'-4,4'-biphenylethanetetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-diphenyltetracarboxylic dianhydride, bis(phthalic acid)phenylphosphine oxide dianhydride, p-phenylene-bis(triphenylphthalic acid)dianhydride, m-phenylene-bis(triphenylphthalic acid)dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis-(anhydrotrimellitate), 2,3,4,5-tetrahydrofurantetracarboxylic dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-furanyl)-naphtho[1,2-c]-furan-1,3,-dione, 1,3,3a,4,5,9b-hexahydro-7-ethyl-5-(tetrahydro-2,5-dioxo-3-furanyl)-naphtho[1,2-c]-furan-1,3,-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione, 1,3,3a,4,5,9b-hexahydro-5,8-dimethyl-5-(tetrahydro-2,5-dioxo-3-furanyl)-naphtho[1,2-c]-furan-1,3-dione, 5-(2,5-dioxotetrahydrofuranyl)-3-methyl-3-cyclohexene-1,2-dicarboxylic dianhydride, or the like.

In addition to the aforesaid examples of the tetracarboxylic dianhydride compounds, other examples of the tetracarboxylic dianhydride component (b) useful for the present invention include the compounds represented by the following formulas (II-1)-(II-6):

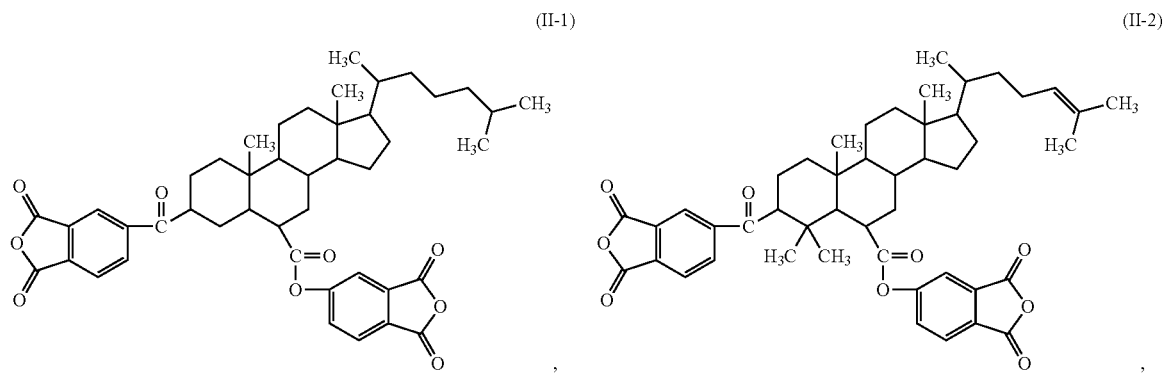

(II-1)

(II-2)

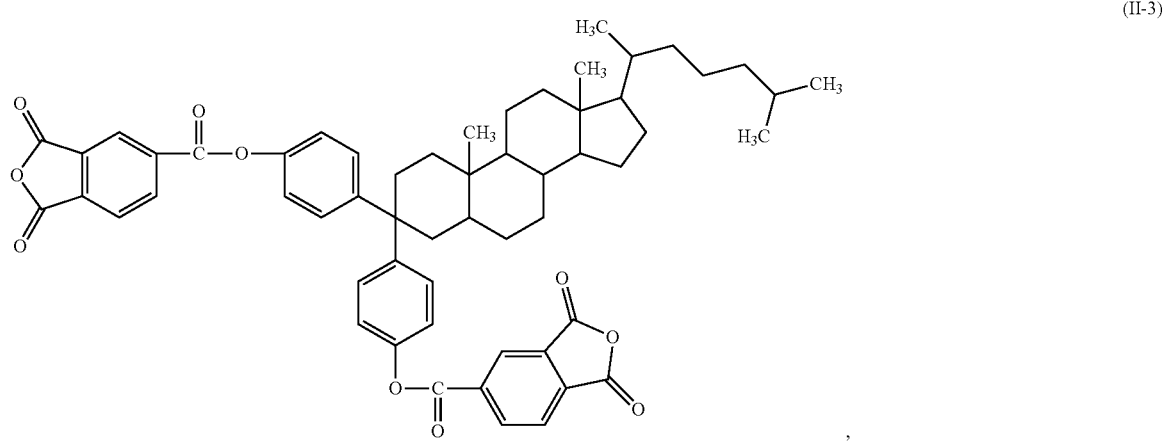

(II-3)

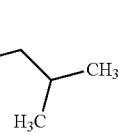
(II-4)

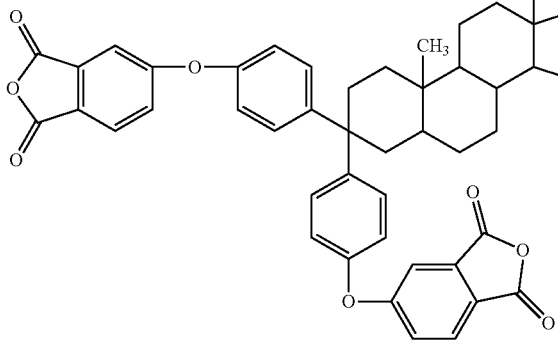
(II-5)

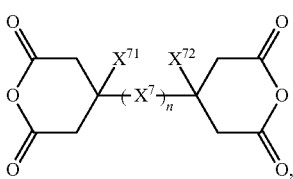
(II-6)

where $X^7$ represents a divalent group having an aromatic ring structure; n represents an integer ranging from 1 to 2; and $X^{71}$ and $X^{72}$ may be the same or different, and independently represent hydrogen or an alkyl group, and

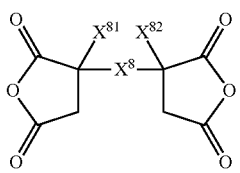

where $X^8$ represents a divalent group having an aromatic ring structure; and $X^{81}$ and $X^{82}$ may be the same or different, and independently represent hydrogen or an alkyl group.

Preferably, the tetracarboxylic dianhydride compound represented by formula (II-5) is selected from

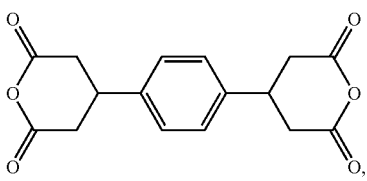
(II-5-1)

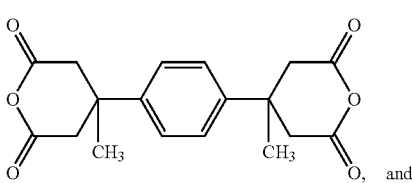
(II-5-2)
and

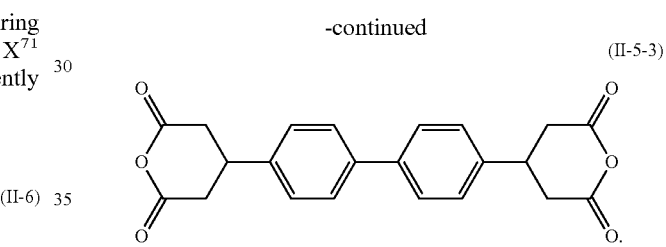
(II-5-3)

Preferably, the tetracarboxylic dianhydride compound represented by formula (II-6) is

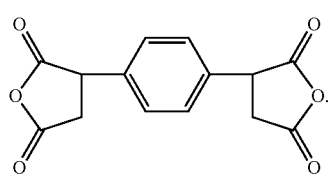
(II-6-1)

Preferred examples of the tetracarboxylic dianhydride component (b) suitable for the present invention include, but are not limited to, 1,2,3,4-cyclobutanetetracarboxylic dianhydride, 1,2,3,4-cyclopentanetetracarboxylic dianhydride, 2,3,5-tricarboxycyclopentylacetic dianhydride, 1,2,4,5-cyclohexanetetracarboxylic dianhydride, 3,4-dicarboxy-1,2,3,4-tetrahydronaphthalene-1-succinic acid dianhydride, pyromellitic dianhydride, 3,3',4,4'-benzophenonetetracarboxylic dianhydride, and 3,3',4,4'-diphenylsulfonetetracarboxylic dianhydride.

Polyamic Acid:

Polyamic acid used for making the liquid crystal alignment agent of the present invention is obtained by subjecting the diamine component (a) and the tetracarboxylic dianhydride component (b) to a polycondensation reaction in a solvent at a temperature ranging from 0 to 100° C. for a period ranging from 1 to 24 hours to obtain a reaction solution containing the obtained polymer. The reaction solution is distilled under a reduced pressure in a distiller to obtain the polyamic acid. Alternatively, the reaction solution can be treated by pouring it into a large amount of poor solvent to obtain a precipitate, which is then dried under a reduced pressure to obtain the polyamic acid.

The tetracarboxylic dianhydride component (b) is used in an amount ranging preferably from 20 to 200 moles, and more preferably from 30 to 120 moles based on 100 moles of the diamine component (a).

The solvent for the polycondensation reaction may be the same as or different from the solvent used in the liquid crystal alignment agent. Furthermore, there is no particular limitation as to the solvent used for the polycondensation reaction as long as the solvent is able to dissolve the reactants and the products. Examples of the solvent for the polycondensation reaction include, but are not limited to, (1) aprotic polar solvents, such as 1-methyl-2-pyrrolidone, N,N-dimethylacetamide, N, N-dimethylformamide, dimethylsulfoxide, γ-butyrolactone, tetramethylurea, hexamethylphosphoric acid triamide, and the like; and (2) phenolic solvents, such as m-cresol, xylenol, phenol, halogenated phenols, and the like.

The solvent for the polycondensation reaction is used in an amount preferably from 200 to 2,000 parts by weight, and more preferably from 300 to 1,800 parts by weight based on 100 parts by weight of a combination of the diamine component (a) and the tetracarboxylic dianhydride component (b).

The aforementioned solvent for the polycondensation reaction can be used in combination with a poor solvent in such an amount that precipitation of the formed polymer will not occur. Examples of the poor solvent include, but are not limited to, (1) alcohols, such as methyl alcohol, ethyl alcohol, isopropyl alcohol, cyclohexanol, ethylene glycol, propylene glycol, 1,4-butanediol, triethylene glycol, or the like; (2) ketones, such as acetone, methyl ethyl ketone, methyl isobutyl ketone, cyclohexanone, or the like; (3) esters, such as methyl acetate, ethyl acetate, butyl acetate, diethyl oxalate, diethylmalonate, ethylene glycol ethyl ether acetate, or the like; (4) ethers, such as diethyl ether, ethylene glycol methyl ether, ethylene glycol ethyl ether, ethylene glycol n-propyl ether, ethylene glycol i-propyl ether, ethylene glycol n-butyl ether, ethylene glycol dimethyl ether, diethylene glycol dimethyl ether, or the like; (5) halogenated hydrocarbons, such as dichloromethane, 1,2-dichloroethane, 1,4-dichlorobutane, trichloroethane, chlorobenzene, o-dichlorobenzene, or the like; and (6) hydrocarbons, such as tetrahydrofuran, hexane, heptane, octane, benzene, toluene, xylene, or the like; or combinations thereof. The examples of the poor solvent may be used alone or in admixture of two or more thereof.

The poor solvent is used in an amount preferably from 0 to 60 parts by weight, and more preferably from 0 to 50 parts by weight based on 100 parts by weight of the diamine component (a).

Polyimide:

Polyimide useful in the present invention is obtained by further dehydration/ring-closure (imidization) processing of the aforesaid polyamic acid to transfer the amic acid functional group of the polyamic acid into the imido functional group.

The imidization processing of the polyamic acid is performed by, for example, dissolving the polyamic acid in a solvent, and heating in the presence of a dehydrating agent and an imidization catalyst to implement a dehydration/ring-closing reaction. The heating temperature for the imidization processing is generally from 40 to 200° C., preferably from 40 to 150° C.

The solvent for the imidization processing may be the same as the solvent used in the liquid crystal alignment agent. The solvent for the imidization processing is used in an amount preferably from 200 to 2,000 parts by weight, and more preferably from 300 to 1,800 parts by weight, based on 100 parts by weight of the polyamic acid.

If the reaction temperature of the imidization processing is lower than 40° C., then the dehydration ring-closing reaction cannot be fully implemented and the imidization extent is unsatisfactory. If the reaction temperature exceeds 200° C., then the weight average molecular weight of the obtained polyimide compound is reduced.

Examples of the dehydrating agent suitable for the imidization processing include acid anhydride compounds, such as acetic anhydride, propionic anhydride, trifluoroacetic anhydride, and the like. The amount of the dehydrating agent used is preferably from 0.01 to 20 moles per mole of the polyamic acid. Examples of the catalyst suitable for the imidization processing include (1) pyridine compounds, such as pyridine, trimethylpyridine, dimethylpyridine, or the like; and (2) tertiary amines, such as triethylamine, or the like. The amount of the catalyst used is preferably from 0.5 to 10 moles per mole of the dehydrating agent.

Polyimide Series Block Copolymer:

The polyimide series block copolymer suitable for the present invention is selected from polyamic acid block copolymer, polyimide block copolymer, polyamic acid-polyimide block copolymer, and combinations thereof.

Preferably, the polyimide series block copolymer is obtained by further polycondensation reaction of a reaction mixture including the polyamic acid and/or the polyimide and optionally the diamine component (a) and the tetracarboxylic dianhydride component (b) in a solvent. The solvent used for the synthesis reaction of the polyimide series block copolymer may be the same as the solvent used for the preparation of the liquid crystal alignment agent.

The solvent for the synthesis reaction of the polyimide series block copolymer is used in an amount preferably from 200 to 2,000 parts by weight, and more preferably from 300 to 1,800 parts by weight based on 100 parts by weight of the reaction mixture for synthesis reaction of the polyimide series block copolymer.

In the polycondensation reaction for the polyimide series block copolymer, the reaction temperature is generally from 0 to 200° C., and preferably from 0 to 100° C.

Preferably, non-limiting examples of the compounds used for the synthesis reaction of the polyimide series block copolymer include: (1) first and second polyamic acids which are different from each other in structure and terminal group; (2) first and second polyimides which are different from each other in structure and terminal group; (3) a polyamic acid and a polyimide which are different from each other in structure and terminal group; (4) a polyamic acid, a diamine component, and a tetracarboxylic dianhydride component, wherein at least one of the diamine component and the tetracarboxylic dianhydride component is structurally different from the one used in the polycondensation reaction of the polyamic acid; (5) a polyimide, a diamine component, and a tetracarboxylic dianhydride component, wherein at least one of the diamine component and the tetracarboxylic dianhydride component is structurally different from the one used in the polycondensation reaction of the polyimide; (6) a polyamic acid, a polyimide, a diamine component, and a tetracarboxylic dianhydride component, wherein at least one of the diamine component and the tetracarboxylic dianhydride component is structurally different from the ones used in the polycondensation reaction of the polyamic acid and the polycondensation reaction of the polyimide; (7) first and second polyamic acids, a diamine component, and a tetracarboxylic dianhydride component, wherein the first and second polyamic acids are structurally different from each other; (8) first and second polyimides, a diamine component, and a tetracarboxylic dianhydride component, wherein the first and second polyimides are structurally different from each other; (9) first and second polyamic acids and a diamine component, wherein the first and second polyamic acids have anhydride terminal groups and are structurally different from each other; (10) first and second polyamic acids and a tetracarboxylic dianhydride component, wherein the first and second polyamic acids have amino terminal groups and are structurally different from each other; (11) first and second polyimides and a diamine component, wherein the first and second polyimides have anhydride terminal groups and are structurally different from each other; and (12) first and second polyimides and a tetracarboxylic dianhydride component, wherein the first and second polyimides have amino terminal groups and are structurally different from each other.

Preferably, the polyamic acid, the polyimide, and the polyimide series block copolymer used in the present invention can also be polymers which are terminal-modified after adjustment of the molecular weight thereof. The terminal-modified polymers can be used to improve the coating property and the like of the liquid crystal alignment agent as long as they will not reduce the effects of the present invention. The process for synthesizing the terminal-modified polymers involves adding monofunctional compounds to the reaction system during the polycondensation reaction of the polyamic acid.

Examples of the monofunctional compounds include, but are not limited to, (1) monoanhydride compounds, such as maleicanhydride, phthalic anhydride, itaconic anhydride, n-decyl succinic anhydride, n-dodecyl succinic anhydride, n-tetradecyl succinic anhydride, n-hexadecyl succinic anhydride, and the like; (2) monoamine compounds, such as aniline, cyclohexylamine, n-butylamine, n-amylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-eicosylamine, and the like; and (3) monoisocyanate compounds, such as phenyl isocyanate, naphthyl isocyanate, and the like.
Solvent (B):

Preferably, the solvent used in the liquid crystal alignment agent of the present invention is selected from the group consisting of N-methyl-2-pyrrolidone, γ-butyrolactone, γ-butyrolactam, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diglycol dimethyl ether, diglycol diethyl ether, diglycol monomethyl ether, diglycol monoethyl ether, diglycol monomethyl ether acetate, diglycol monoethyl ether acetate, N,N-dimethylformamide, N,N-dimethylethanamide, and the like. The examples of the solvent may be used alone or in admixture of two or more thereof.
Hydroxyl Compound (C):

Preferably, the hydroxyl compound (C) used in the liquid crystal alignment agent of the present invention has a weight average molecular weight ranging from 300 to 1,000,000. When the hydroxyl compound (C) has a weight average molecular weight out of the range defined above, a liquid crystal display device including a liquid crystal alignment film formed from a liquid crystal alignment agent made thereby may have disadvantages of severely reduced voltage holding ratio and increased ion density.

The weight average molecular weight of the hydroxyl compound (C) ranges more preferably from 500 to 900,000, and most preferably from 700 to 800,000.

Commercially available examples of the hydroxyl compound (C) suitable for the present invention include, but are not limited to, PEG-300, PEG-400, PEG-600, PEG-1000, PEG-1500, PEG-2000, PEG-4000N, PEG-4000S, PEG-6000E, PEG-6000P, PEG-10000, PEG-13000, PEG-20000, and PEG-20000P manufactured by Sanyo Chemical Industries, Ltd.; PEG 300, PEG 1000, PEG 2000, PEG 4000, PEG 6000, PEG 8000, PEG 10000, PEG 12000, PEG 20000, and PEG 35000 manufactured by Merck; P2139, P3265, P3515, 81210, 81240, 81260, 81285, 81310, 181986, 181994, 182001, 182028, 189456, 202304, 202312, 202320, 202339, 202398, 202421, 202436, 202444, 202452, 295906, 309028, 372773, 372781, 373001, 412325, 435406, 435422, 435457, 637726, and BioXtra manufactured by SIGMA-ALDRICH; SINOPOL PEG600, SINOPOL PEG1500, and SINOPOL PEG4000 manufactured by Sino-Japan Chemical Co., Ltd.; and PEG#300, PEG#400, PEG#600, PEG#1000, PEG#1500, PEG#1540, PEG#4000, and PEG#6000M manufactured by LION.

The hydroxyl compound (C) is used in an amount preferably from 1 to 15 parts by weight, more preferably from 2 to 12 parts by weight, and most preferably from 3 to 10 parts by weight based on 100 parts by weight of the polymer composition (A). When the hydroxyl compound (C) is used in the range defined above, a liquid crystal display device including a liquid crystal alignment film formed from a liquid crystal alignment agent made thereby can maintain a satisfactorily high voltage holding ratio after UV irradiation.
Additives (D):

The additives (D), such as functional-group-containing silane compounds or epoxide compounds, may be added to the liquid crystal alignment agent of the present invention so as to improve adhesion of the liquid crystal alignment agent to the substrate to be applied as long as the desired properties of the liquid crystal alignment agent are not impaired. The additives (D) may be used alone or in admixture of two or more thereof.

Examples of the functional-group-containing silane compounds include, but are not limited to, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane, or the like.

Examples of the epoxide compounds include, but are not limited to, ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, 2,2-dibromo-neopentyl glycol diglycidyl ether, 1,3,5,6-tetragylcidyl-2,4-hexanediol, N,N,N',N'-tetragylcidyl-m-xylenediamine, 1,3-bis(N,N-digylcidylaminomethyl)cyclohexane, N,N,N',N'-tetragylcidyl-4,4'-diaminodiphenylmethane, N,N-gylcidyl-p-glycidoxyaniline, 3-(N-allyl-N-glycidyl)aminopropyltrimethoxysilane, 3-(N,N-diglycidyl)aminopropyltrimethoxysilane, or the like.

There is no specific limitation regarding the method used for preparing the liquid crystal alignment agent of the present invention. A conventional mixing method can be used. For example, the liquid crystal alignment agent of the present invention can be made by mixing the polyamic acid, the polyimide, and optionally the polyimide series block copolymer to obtain the polymer composition (A), which is then added with the solvent (B), the hydroxyl compound (C), and optionally the additives (D) at a temperature ranging from 0 to 200° C., followed by stirring until the polymer composition (A), the hydroxyl compound (C), and the optional additives (D) are dissolved in the solvent (B).

In order to provide better printability for the liquid crystal alignment agent, the solvent (B) used for preparing the liquid crystal alignment agent is in an amount ranging preferably from 1,000 to 2,000 parts by weight, and more preferably from 1,200 to 2,000 parts by weight based on 100 parts by weight of the polymer composition (A).

The additives (D) are in an amount ranging preferably from 0.5 to 50 parts by weight, and more preferably from 1 to 45 parts by weight based on 100 parts by weight of the polymer composition (A).

Formation of Liquid Crystal Alignment Film:

The prepared liquid crystal alignment agent is applied to a substrate by a roller coating method, a spinner coating method, a printing method, an ink-jet method, or the like to form a coating film. The coating film is then treated by a pre-bake treatment, a post-bake treatment and an alignment treatment to obtain a liquid crystal alignment film.

The pre-bake treatment causes the organic solvent to volatilize. The temperature for the pre-bake treatment is generally from 30 to 120° C., preferably from 40 to 110° C., and more preferably from 50 to 100° C.

The post-bake treatment is carried out to cause a dehydration/ring-closure (imidization) reaction. The temperature for the post-bake treatment is generally from 150 to 300° C., preferably from 180 to 280° C., and more preferably from 200 and 250° C.

The alignment treatment is carried out by rubbing the coating film in a certain direction with a roller wound with a cloth made of nylon, rayon, or cotton fiber according to the requirements.

Liquid Crystal Display Element:

Referring to FIG. 1, a preferred embodiment of a liquid crystal display element according to this invention includes a first unit 11, a second unit 12 spaced apart from the first unit 11, and a liquid crystal unit 13 disposed between the first unit 11 and the second unit 12.

The first unit 11 includes a first substrate 111, a first conductive film 112 formed on the first substrate 111, and a first liquid crystal alignment film 113 formed on the first conductive film 112 and opposite to the first substrate 111.

The second unit 12 includes a second substrate 121, a second conductive film 122 formed on the second substrate 121, and a second liquid crystal alignment film 123 formed on the second conductive film 122 and opposite to the second substrate 121.

The first and second substrates 111, 121 suitable for the present invention are made of a transparent material commonly used in liquid crystal display devices, for example, alkali-free glass, soda-lime glass, hard glass (Pyrex glass), quartz glass, polyethylene terephthalate, polybutylene terephthalate, polyether sulphone, polycarbonate, or the like. The first and second conductive films 112, 122 may be a film made of tin oxide ($SnO_2$), indium oxide-tin oxide ($In_2O_3$—$SnO_2$), or the like.

The first and second liquid crystal alignment films 113, 123 are each a film made of the liquid crystal alignment agent of the present invention, and are used for providing the liquid crystal unit 13 with a pretilt angle. The liquid crystal unit 13 can be activated by an electric field cooperatively produced by the first and second conductive films 112, 122.

Preferably, the liquid crystal unit 13 includes a liquid crystal material. Examples of the liquid crystal material include, but are not limited to, diaminobenzene liquid crystals, pyridazine liquid crystals, Shiff Base liquid crystals, azoxy liquid crystals, biphenyl liquid crystals, phenylcyclohexane liquid crystals, biphenyl liquid crystals, phenylcyclohexane liquid crystals, ester liquid crystals, terphenyl liquid crystals, biphenylcyclohexane liquid crystals, pyrimidine liquid crystals, dioxane liquid crystals, bicyclooctane liquid crystals, cubane liquid crystals, or the like. Furthermore, ferroelectric liquid crystals, such as cholesterol liquid crystals, for example, cholesteryl chloride, cholesteryl nonanoate, cholesteryl carbonate, or the like, chiral agents sold under the trade names C-15, CB-15 (manufactured by Merck Company), or p-decyloxybenzylidene-p-amino-2-methylbutyl cinnamate may be added to the above liquid crystals, as required. The aforesaid examples of the liquid crystal material can be used alone or in admixture of two or more.

EXAMPLES

The following examples are provided to illustrate the preferred embodiments of the invention, and should not be construed as limiting the scope of the invention.

[Preparation of Polyamic Acid]:

Synthesis Example 1

A 500 ml four-necked conical flask equipped with a nitrogen inlet, a stirrer, a condenser and a thermometer was purged with nitrogen, and was added with the compound having the aforesaid formula (I-2-1) (referred to as a-1 hereinafter, 1.69 g, 0.003 mole), p-diaminobenzene (referred to as a-4 hereinafter, 5.02 g, 0.0047 mole), and N-methyl-2-pyrrolidone (referred to as NMP hereinafter, 80 g). Stirring was conducted at room temperature until a-1 and a-4 were dissolved in NMP. Pyromellitic dianhydride (referred to as b-1 hereinafter, 10.91 g, 0.05 mole) and NMP (20 g) were then added and allowed to undergo reaction for 2 hours at room temperature. The reaction solution was then poured into water (1500 ml) to precipitate a polymer. The polymer obtained after filtering was washed with methanol and filtered three times, and was dried in a vacuum oven at 60° C. to obtain a polyamic acid polymer (A-1-1).

Synthesis Examples 2 and 3

Polyamic acid polymers (A-1-2) and (A-1-3) were prepared according to the method of Synthesis Example 1 except that the diamine components, the tetracarboxylic dianhydride components, and the amounts thereof as shown in Table 1 were used instead.

21

[Preparation of Polyimide]

Synthesis Example 4

A 500 ml four-necked conical flask equipped with a nitrogen inlet, a stirrer, a condenser and a thermometer was purged with nitrogen, and was added with a-4 (4.54 g, 0.0425 mole), 4,4'-diaminodiphenylmethane (referred to as a-5 hereinafter, 1.49 g, 0.0075 mole), and NMP (80 g). Stirring was conducted at room temperature until a-4 and a-5 were dissolved in NMP. NMP (20 g) and b-1 (10.69 g, 0.049 mole) were then added and allowed to undergo reaction 6 hours at room temperature. NMP (97 g), acetic anhydride (5.61 g), and pyridine (19.75 g) were then added. Stirring was continued for 2 hours at 60° C. to cause imidization reaction. The reaction solution was then poured into water (1500 ml) to precipitate a polymer. The polymer obtained after filtering was washed with methanol and filtered three times, and was dried in a vacuum oven at 60° C. to obtain a polyimide polymer (A-2-1).

Synthesis Examples 5 to 7

Polyimide polymers (A-2-2), (A-2-3), and (A-2-4) were prepared according to the method of Synthesis Example 4 except that the diamine components, the tetracarboxylic dianhydride components, and the amounts thereof as shown in Table 1 were used instead.

TABLE 1

| Components (mol %) | | Synthesis Examples | | | | | | |
|---|---|---|---|---|---|---|---|---|
| | | 1 A-1-1 | 2 A-1-2 | 3 A-1-3 | 4 A-2-1 | 5 A-2-2 | 6 A-2-3 | 7 A-2-4 |
| diamine components(a) | a-1 | 6 | 15 | — | — | — | 6 | 6 |
| | a-2 | — | — | 80 | — | — | — | — |
| | a-3 | — | — | — | — | 20 | — | — |
| | a-4 | 94 | 55 | — | 85 | — | — | — |
| | a-5 | — | 30 | 20 | 15 | — | 94 | — |
| | a-6 | — | — | — | — | 80 | — | 94 |
| tetracarboxylic dianhydride components (b) | b-1 | 100 | 50 | — | 98 | — | — | — |
| | b-2 | — | 50 | 101 | — | — | 100 | — |
| | b-3 | — | — | — | — | 100 | — | 97 |

Note:
a-1: a compound having the aforesaid formula (I-2-1),
a-2: 1,1-bis[4-(4-aminophenoxy)phenyl]-4-(4-ethylphenyl)cyclohexane,
a-3: 5-[4-(4-n-pentylcyclohexyl)cyclohexyl]phenylmethylene-1,3-diaminobenzene,
a-4: p-diaminobenzene,
a-5: 4,4'-diaminodiphenylmethane,
a-6: 4,4'-diaminodiphenylether,
b-1: pyromellitic dianhydride,
b-2: 1,2,3,4-cyclobutanetetracarboxylic dianhydride,
b-3: 3,4-dicarboxy-1,2,3,4-tetrahydronaphthalene-1-succinic acid dianhydride.

[Preparation of Liquid Crystal Alignment Agent, Liquid Crystal Alignment Film, and Liquid Crystal Display Element]

Example 1

100 parts by weight of the polyamic acid polymer (A-1-1) of Synthesis Example 1, 1000 parts by weight of N-methyl-2-pyrrolidone (referred to as B-1 hereinafter), 500 parts by weight of ethylene glycol n-butyl ether (referred to as B-2 hereinafter), and 20 parts by weight of PEG#30 (referred to as C-1 hereinafter) were stirred at room temperature to form a liquid crystal alignment agent.

The liquid crystal alignment agent was coated onto two glass substrates each having an ITO (indium-tin-oxide) conductive film using a printing machine (manufactured by Japan Nissha Printing Co., Ltd., Model S15-036), after which the glass substrates coated with the alignment agent were pre-baked on a heating plate at a temperature of 100° C. for 5 minutes, and were then post-baked in a hot air circulation baking oven at a temperature of 220° C. for 30 minutes, followed by an alignment treatment to form a liquid crystal alignment film on each of the glass substrates.

A thermo-compression adhesive agent was applied to one of the glass substrates formed with the liquid crystal alignment films, and spacers of 4 µm were sprayed on the other of the glass substrates formed with the liquid crystal alignment films. The two glass substrates were aligned and bonded together in a vertical direction, and then 10 kg of pressure was applied thereto using a thermo-compressor to carry out thermo-compression at 150° C. Liquid crystal was poured using a liquid crystal pouring machine (manufactured by Shimadzu Corporation, Model ALIS-100X-CH), ultraviolet light was then used to harden a sealant so as to seal a liquid crystal injection hole, and an annealing treatment was conducted in an oven at 60° C. for 30 minutes, thereby manufacturing a liquid crystal display element. The liquid crystal alignment film and the liquid crystal display element were evaluated using the following evaluation methods. The results are shown in Table 2.

Examples 2 to 7

In Examples 2 to 7, the liquid crystal alignment agents, the liquid crystal alignment films, and the liquid crystal display elements were prepared in the same manner as in Example 1 using the polymer compositions (A), the solvents (B), the hydroxyl compounds (C), and the additives (D) shown in Table 2. The liquid crystal alignment films and the liquid crystal display elements thus obtained were evaluated using the following evaluation methods. The results are shown in Table 2.

Comparative Examples 1 to 4

In Comparative Examples 1 to 4, the liquid crystal alignment agents, the liquid crystal alignment films, and the liquid crystal display elements were prepared in a same manner as in Example 1 except the following. The hydroxyl compound used in Comparative Example 1 has a weight average molecular weight of 200. The hydroxyl compound used in Comparative Example 2 has a weight average molecular weight of 2,000,000. In Comparative Examples 3 and 4, there is no hydroxyl compound added. Furthermore, the polymer compositions (A), the solvents (B), the additives (D), and the amounts thereof as shown in Table 2 were used. The liquid crystal alignment films and the liquid crystal display elements thus obtained were evaluated using the following evaluation methods. The results are shown in Table 2.

[Evaluation Items]
UV Stability:
a. Voltage Holding Ratio:

The voltage holding ratio of each of the liquid crystal display devices of Examples 1 to 7 and Comparative Examples 1 to 4 was measured using an electrical measuring machine (manufactured by TOYO Corporation, Model 6254). A voltage of 4 volts was applied for 2 milliseconds. The applied voltage was held for 1667 milliseconds. After the applied voltage was cut off for 1667 milliseconds, the voltage holding ratio (VHR1) was measured and recorded. Each of the liquid crystal display devices was then irradiated by a UV light of 4200 mJ/cm$^2$ using a UV irradiation machine (KN-SH48K1 manufactured by Kuang Neng). The voltage holding ratio (VHR2) after the UV irradiation was measured and recorded. UV stability (VHR$^{UV}$) based on the voltage holding ratio was calculated according to the following equation and was evaluated according to the following standards:

$$VHR^{UV}(\%) = \frac{VHR1 - VHR2}{VHR1} \times 100\%$$

◉: VHR$^{UV}$<5%
○: 5%≤VHR$^{UV}$<10%
Δ: 10%≤VHR$^{UV}$<20%
X: 20%≥VHR$^{UV}$ b. Ion Density:

The ion density of each of the liquid crystal display devices of Examples 1 to 7 and Comparative Examples 1 to 4 was measured using an electrical measuring machine (manufactured by TOYO Corporation, Model 6254) under measurement conditions of a voltage of 1.7 V and a triangular wave of 0.01 Hz. In a current and voltage wave form, a peak area between 0 and 1 V was calculated to obtain the ion density (ID1). Each of the liquid crystal display devices was then irradiated by a UV light of 4200 mJ/cm² using a UV irradiation machine (KN-SH48K1 manufactured by Kuang Neng). The ion density (ID2) after the UV irradiation was measured and recorded in the same manner. UV stability (ID$^{UV}$) based on the ion density was calculated according to the following equation and was evaluated according to the following standards:

$$ID^{UV}(\%) = \frac{ID1 - ID2}{ID1} \times 100\%$$

◉: ID$^{UV}$<5%
○: 5%≤ID$^{UV}$<10%
Δ: 10%≤20%
X: 20%≥ID$^{UV}$

TABLE 2

| Components (parts by weight) | | Examples | | | | | | | Comparative Examples | | | |
|---|---|---|---|---|---|---|---|---|---|---|---|---|
| | | 1 | 2 | 3 | 4 | 5 | 6 | 7 | 1 | 2 | 3 | 4 |
| Polymer Compositions (A) | A-1-1 | 100 | — | — | — | — | — | — | 100 | — | — | — |
| | A-1-2 | — | 100 | — | — | — | — | — | — | 100 | — | — |
| | A-1-3 | — | — | 100 | — | — | — | — | — | — | — | 100 |
| | A-2-1 | — | — | — | 100 | — | — | — | — | — | 100 | — |
| | A-2-2 | — | — | — | — | 100 | — | — | — | — | — | — |
| | A-2-3 | — | — | — | — | — | 100 | — | — | — | — | — |
| | A-2-4 | — | — | — | — | — | — | 100 | — | — | — | — |
| Solvents (B) | B-1 | 1000 | 1000 | — | 600 | 1000 | — | 1800 | 1000 | 1000 | 600 | — |
| | B-2 | 500 | — | 300 | 400 | 300 | 1200 | — | 500 | — | 400 | 300 |
| | B-3 | — | 500 | 1000 | — | 300 | — | — | — | 500 | — | 1000 |
| Hydroxyl Compounds (C) (Mw: 300 to 1,000,000) | C-1 | 20 | — | — | — | — | — | — | — | — | — | — |
| | C-2 | — | 5 | — | — | — | — | — | — | — | — | — |
| | C-3 | — | — | 10 | — | — | 15 | — | — | — | — | — |
| | C-4 | — | — | — | 3 | — | — | — | — | — | — | — |
| | C-5 | — | — | — | 3 | — | — | — | — | — | — | — |
| | C-6 | — | — | — | — | 6 | — | 0.5 | — | — | — | — |
| Other Hydroxyl Compounds (C') | C'-1 | — | — | — | — | — | — | — | 20 | — | — | — |
| | C'-2 | — | — | — | — | — | — | — | — | 5 | — | — |
| Additives (D) | D-1 | — | — | 5 | — | — | — | 3 | — | — | — | 5 |
| | D-2 | — | — | — | — | 2 | — | 1 | — | — | — | — |
| Evaluation Results | UV Stability Voltage Holding Ratio | ○ | ◉ | ◉ | ◉ | ◉ | ◉ | ○ | X | X | X | X |
| | Ion Density | ○ | ◉ | ◉ | ◉ | ○ | ◉ | ○ | X | X | X | X |

| No. | Compound | Weight Average Molecular Weight |
|---|---|---|
| B-1: | N-methyl-2-pyrrolidone | — |
| B-2: | ethylene glycol n-butyl ether | — |
| B-3: | N,N-dimethylacetamide | — |
| C-1: | PEG#300 manufactured by LION | 300 |
| C-2: | PEG-600 manufactured by Sanyo Chemical Industries, Ltd. | 600 |
| C-3: | PEG 4000 manufactured by Sino-Japan Chemical Co. | 4000 |
| C-4: | PEG 20000 manufactured by Merck | 20,000 |
| C-5: | 189456 manufactured by SIGMA-ALDRICH | 900,000 |
| C-6: | 372781 manufactured by SIGMA-ALDRICH | 1,000,000 |
| C'-1: | PEG 200 manufactured by Merck | 200 |
| C'-2: | 372803 manufactured by SIGMA-ALDRICH | 2,000,000 |
| D-1: | N,N,N',N'-tetraglycidyl-4,4'-diaminodiphenylmethane- | — |
| D-2: | N,N-glycidyl-p-glycidoxyaniline | — |

As shown in Table 2, in Examples 1 to 7, in which hydroxyl compounds having weight average molecular weight ranging from 300 to 1,000,000 were used, the liquid crystal alignment agents have enhanced UV stability, and the liquid crystal display devices including liquid crystal alignment films formed from the liquid crystal alignment agents have good voltage holding ratio and reduced ion density after UV irradiation. In Comparative Examples 1 to 4, in which hydroxyl compounds having weight average molecular weight ranging from 300 to 1,000,000 were not used, the liquid crystal display devices including liquid crystal alignment films formed thereby have a severely reduced voltage holding ratio and an increased ion density after UV irradiation.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A liquid crystal alignment agent, comprising:
   a polymer composition obtained by subjecting a diamine component and a tetracarboxylic dianhydride component to a reaction,
   a solvent, and
   a polyoxyethylene having a weight average molecular weight ranging from 4,000 to 1,000,000.

2. The liquid crystal alignment agent as claimed in claim 1, wherein said weight average molecular weight ranges from 4,000 to 900,000.

3. The liquid crystal alignment agent as claimed in claim 2, wherein said weight average molecular weight ranges from 4,000 to 800,000.

4. The liquid crystal alignment agent as claimed in claim 1, wherein said polyoxyethylene is used in an amount ranging from 1 to 15 parts by weight based on 100 parts by weight of said polymer composition.

5. The liquid crystal alignment agent as claimed in claim 4, wherein said polyoxyethylene is used in an amount ranging from 2 to 12 parts by weight based on 100 parts by weight of said polymer composition.

6. The liquid crystal alignment agent as claimed in claim 5, wherein said polyoxyethylene is used in an amount ranging from 3 to 10 parts by weight based on 100 parts by weight of said polymer composition.

7. A liquid crystal alignment film formed from the liquid crystal alignment agent as claimed in claim 1.

8. A liquid crystal display element, comprising the liquid crystal alignment film as in claim 7.

* * * * *